Patented June 13, 1939

2,161,937

UNITED STATES PATENT OFFICE 2,161,937

SULPHATED A,A'-DIALKYL GLYCERINE ETHERS AND PROCESS FOR PREPARING THEM

Norman D. Scott, Sanborn, N. Y., assignor to E. I. du Pont de Nemours & Company, Wilmington, Del., a corporation of Delaware No Drawing. Application January 13, 1938, Serial No. 184,899

8 Claims. (Cl. 260—458)

This invention relates to sulfated organic compounds. It comprises the process of making sulfuric acid esters, the sulfuric acid esters themselves, and their use. More particularly it relates to b-sulfation products of a,a'-alkyl glycerine ethers, their preparation and application as wetting, dispersing, deterging and emulsifying agents, as dye bath assistants, and in general as textile assistants.

The water soluble sulfate esters of a,a'-dialkyl glycerine ethers have not heretofore been prepared so far as applicant is aware. There have been disclosed in the prior art certain oil-soluble high molecular weight sulfate esters of a,a'-dialkyl glycerine ethers, but that type of compound does not come within the purpose and scope of this invention. The compounds which applicant has provided are of comparatively low molecular weight, possess excellent solubility in water, and form with it useful foaming solutions.

Developments in the textile industry have created a demand for improved agents of the class generally referred to as textile assistants. It, therefore, is the general object of this invention to provide a new and useful group of materials for such purpose, and procedure for their manufacture: further objects will be pointed out later or will be evident from the description of the invention.

It has been discovered that a new group of chemical compounds of particular use in the textile arts can be obtained by sulfating a,a' dialkyl glycerine ethers having a limited range of carbon atoms content in the molecule. For the purposes of this invention the a,a' dialkyl glycerine ethers used are limited to those containing not more than 25 carbon atoms in the molecule.

The dialkyl glycerine ethers themselves which it is preferred to use in this invention may be prepared conveniently by methods which are described in our copending application Ser. No. 184,900 filed Jan. 13, 1938. From that application the following details are taken as illustrative of one method of preparation:

2.2 mols of sodium are dissolved in 6.2 mols of 2 ethyl hexanol at 100°. 1 mol of dichlorhydrin is added at 120° over a period of 50 minutes. The mixture is then heated for an hour longer at 120°, cooled and washed with water. The product is distilled under diminished pressure. The a,a'-di(2 ethyl hexyl) glycerine ether is obtained as a water white liquid boiling between 160–180° at 4–6 mm.

This example represents merely one possible method of preparation. The di-ethers can also be prepared by reacting dichlorhydrin and an alcohol in the presence of an alkaline condensing agent e. g. KOH; epichlorhydrin, an alcohol, and KOH; disodium glyceroxide and an ester of the alcohol with a hydrohalogen acid, sulfuric acid or phosphorus acid. The ether can also be prepared in two steps by first preparing the mono alkyl ether and then the dialkyl ether in a second operation. This procedure is more convenient when preparing unsymmetrical ethers.

These references to methods for preparing a,a'-dialkyl glycerine ethers are inserted merely for informative purposes and it is to be understood that applicants' sulfation process applies to a,a' dialkyl glycerine ethers of the carbon range specified, no matter how obtained.

For the sulfation of a,a'-dialkyl glycerine ethers a wide range of sulfating agents may be used but it is preferred to employ chlorsulfonic acid or chlorsulfonic acid with ether or other suitable diluent. Concentrated sulfuric acid modified with commonly used inhibitors such as potassium acid sulfate give good results. Among other particular sulfating agents that may be mentioned as satisfactory for our purpose are: sodium chlor-sulfonate, aminosulfonic acid, pyridine sulfuric anhydride, dimethylaniline-sulfuric anhydride, pyridine-sodium pyrosulfate, acetyl sulfuric acid, lower alkyl sulfates, $SO_3$ dissolved in ether, etc.

The degree of sulfation is dependent chiefly on the nature of the a,a'-dialkyl glycerine ether sulfated, the choice and amount of sulfating agent used, time of sulfation, agitation, amount of solvent used and temperature. Temperatures of 0–10° C. are employed ordinarily, but with certain inhibitors in the sulfating acid it is possible to operate at somewhat higher temperatures and shorten the time of sulfation.

The following examples which are not to be construed as limitative, illustrate the sulfation of several a,a'-dialkyl glycerine ethers by procedure within the scope of the invention.

*Example I*

To 50 grams of a,a'-di(2 ethyl hexyl) glycerine ether is added dropwise 22 grams of chlor-sulfonic acid keeping the temperature at 0–10°. After all the acid has been added the mixture is stirred until a test drop is water-soluble. The sulfation mass is drowned in a solution of caustic soda and ice. The salt of the sulfate ester separates as an oil containing about 25% active ingredient. This oil which is an aqueous solution of the sodium salt of sulfated di a,a'-(2 ethyl hexyl) glycerine ether can be used in that form or dried preferably under reduced pressure to a white waxy mass. The product has excellent water solubility, foaming properties and surface active properties.

*Example II*

The above reaction can be carried out using the same proportions in diethyl ether as solvent for the glycerine ether. After neutralizing, the active ingredient separates out in the ether layer. It can be obtained by evaporating the ether layer. It is not different in properties from the sulfate ester prepared using no diluent.

*Example III*

22 grams of chloro-sulfonic acid are added with stirring to 50 grams of a,2-ethyl hexyl, a'2-ethyl butyl glycerine ether at a temperature of 10 to 15° C. On completing the addition of chloro-sulfonic acid, the sulfation mass is stirred until a test drop is soluble in water and then poured into a solution of 35 grams of 50% caustic soda in 200 cc. of water. The product is a foaming solution which has excellent foaming and wetting properties.

*Example IV*

To 50 grams of a,a'-dioctyl glycerine ether are added 19 grams of chloro-sulfonic acid holding the temperature between 10–15° C. After a test drop is soluble in water the sulfation mass is drowned in a solution of 19 grams of 50% caustic soda solution in 150 cc. of water. The product has excellent wetting out properties.

*Example V*

16.1 grams of chloro-sulfonic acid are added with stirring to 40 grams of a,a'-di(2,4-dimethyl pentyl) glycerine ether holding the temperature at 5–10° C. When a test drop is soluble in water, the sulfation mass is poured into a mixture of 350 cc. of water and 25 grams of 50% caustic soda solution. The product which is a solution of the sodium salt of the sulfate ester of a,a'-di(2,4-dimethyl pentyl) glycerine ether is an excellent wetting agent.

*Example VI*

To 30 grams of a mixture of glycerine di-ethers prepared by alkylating both primary hydroxyl groups of glycerine with higher alcohols (b. p. 133–150°) from the synthetic methanol synthesis, dissolved in 100 cc. of ether, are added 12.8 grams of chloro-sulfonic acid, holding the temperature at 0–10° C. When a test drop is soluble in water, the sulfation mass is drowned in 18 grams of 50% caustic soda solution and 200 grams of ice. The neutralized mass separates into two layers. The upper ether layer is added to a mixture of 100 cc. of water and 100 cc. of methanol, then petroleum ether extracted. The extracted solution on evaporating gives a waxy solid having surface active properties.

The scope of this invention is restricted to sulfate esters of di-glycerine ethers having less than 25 carbon atoms and having the general formula R—O—CH$_2$—CHOH—CH$_2$OR$^1$ wherein R and R$^1$ may be the same or different radicals. The radicals which may be included are alkyl radicals such as methyl, ethyl, butyl, isobutyl, ter. butyl, hexyl octyl, octyl-2, hexyl-3, 2,5-dimethyl pentyl. The radicals may also be cyclic radicals as tolyl, butyl phenyl, butyl cyclohexyl, a-naphthyl, phenyl ethyl, naphthenyl, abietyl and hydroabietyl.

The following list is illustrative of some of the typical compounds:

a,a'-di 2-ethyl butyl glycerine ether b sodium sulfate
a,a'-di hexyl glycerine ether b sodium sulfate
a,a'-di ethyl glycerine ether b sodium sulfate
a,a'-di (2,4-dimethyl pentyl) glycerine ether b sodium sulfate
a,2-ethyl butyl, a'2-ethyl hexyl glycerine ether b sodium sulfate
a,lauryl a' methyl glycerine ether b sodium sulfate
a,a'-di (amyl phenyl) glycerine ether b sodium sulfate
a-methyl a'-abietyl glycerine ether b sodium sulfate There are many other combinations of groups which may be included in this invention. The choice of a particular configuration and size depends on the type of surface active agent required. A wetting agent will have a fairly large molecular weight while a mercerizing assistant will have a much lower molecular weight. It is one of the values of this invention that the configuration and size of the molecule can be readily varied to meet the particular type of agent required.

While the sodium salt of the sulfated ethers has been disclosed salts of other bases can also be used, such as potassium, lithium, magnesium, ammonium, trimethylamine, triethanolamine and pyridine salts. For certain uses it may be necessary or advantageous to use a salt other than the sodium salt. The free acid can be use if desired.

The compounds of this invention in general exhibit high water solubility and great surface activity. A list of many particular uses for which they are suitable is given below:

A. Treatment for the processing and improvement of natural or synthetic textile materials involving:

1. Cleansing vegetable and animal fibers when removing fatty or oily materials
2. Carbonization
3. As an addition to flax retting baths
4. Fulling
5. Sizing
6. As an addition when sizing is removed from textile materials
7. Impregnating
8. Bleaching
9. Mordanting
10. As an addition to soap in an acid or hard water bath
11. Mercerizing lye liquors
12. Improvement of absorption capability of fibrous materials particularly when subjected to a treatment for finishing, softening, stiffening, coloring or special chemical treatment such as waterproofing or mildewproofing
13. Delustering or lustering
14. Degumming
15. Kier boiling
16. Scouring
17. Stripping
18. Felting
19. Oiling or lubricating
20. Weighting or loading B. Dyeing processes
1. Dyeing in neutral, acid or alkaline baths
2. Reserving cotton in said baths
3. Dyeing with developed dyes
4. Dyeing of animal fibers with vat dyes
5. Dyeing cellulose acetate fibers with insoluble dyes
6. Dyeing and printing with aniline black
7. Dyeing of leather
8. In printing pastes to assist in the dispersion of the dye or dye component and in the penetration into the natural or synthetic fiber C. Dyes and coloring material
1. For making pastes of dyes or dye components
2. For the production of pigments of azo, basic, acid vat, and sulfur dyes in a finely divided condition
3. For the production of finely divided inorganic pigments D. Miscellaneous uses
1. For converting liquid or solid substances normally insoluble in water, such as hydrocarbons, higher alcohols, other oxygen containing compounds, fats, oils, waxes, resins, pitches and pitchy substances into clear solutions or stable emulsions or dispersions
2. As cleansing agents particularly in hard water and where a fatty or oily film resists the ordinary cleansing media
3. In tanning
4. In softening and treating baths for hides and skins, particularly the fat liquid treatment
5. In flotation processes including minerals and oils such as the recovery of fixed oil from the oil sands
6. In tooth pastes, tooth powders and dentifrices generally
7. In the treatment of paper pulp and cellulosic materials generally
8. In latex solutions and adhesives containing latex and related substances
9. As a mold lubricant for use in the manufacture of rubber and other molded or moldable products
10. For the breaking of petroleum emulsions which occur in nature or are formed during the refining of petroleum E. General
1. The reagents may be used in pure or standardized form
2. They may be used in conjunction with the known processing or treating agents Of course no single compound shows all these properties to a marked degree. A good wetting agent is not necessarily the best detergent or best softening agent but it is an advantage of this class of bodies that by a selection of the proper configuration and molecular size the particular property desired can be attained.

As previously stated, this invention is restricted to water-soluble sulfate esters of a,a'-dialkyl glycerine ethers, having less than twenty-five carbon atoms in the molecule. The invention includes all ethers both symmetrical and unsymmetrical having cyclic alkyl, aryl and aralkyl groups as well as alkyl groups. The following compounds within the group have been found to posses exceptional merit, a,a'-di(2 ethyl hexyl) glycerine ether sodium sulfate, a,a' - di(2,5 dimethyl pentyl) glycerine ether sodium sulfate and a,2-ethyl butyl a',2-ethyl hexyl glycerine ether sodium sulfate.

As many apparently widely different embodiments of this invention may be made without departing from the spirit and scope thereof, it is to be understood that I do not limit myself to specific embodiments thereof except as defined in the appended claims.

I claim:
1. The process of preparing surface active substances which comprises reacting a,a'-dialkyl glycerine ethers having not more than twenty-five carbon atoms in the molecule with a sulfating agent at a low temperature until sulfation in the beta position is at least partially complete.
2. The process of preparing surface active substances which comprises reacting a,a'-dialkyl glycerine ethers having not more than twenty-five carbon atoms in the molecule with a sulfating agent, in the presence of an inert solvent, until sulfation in the beta position is at least partially complete.
3. The process of preparing surface active substances which comprises reacting a,a'-dialkyl glycerine ethers having not more than twenty-five carbon atoms in the molecule with chlorsulfonic acid, at a low temperature, until sulfation in the beta position is at least partially complete.
4. The process of preparing surface active substances which comprises reacting a,a'-dialkyl glycerine ethers having not more than twenty-five carbon atoms in the molecule with a sulfating agent at a low temperature until sulfation in the beta position is at least partially complete, neutralizing the reaction mixture and separating the sulfated product from the reaction mixture.
5. A surface active compound of the group consisting of the acid and water-soluble salt forms of beta sulfated a,a'-dialkyl glycerine ethers having not more than twenty-five carbon atoms in the molecule.
6. The beta sulfuric acid ester of a,a'-di (2 ethyl hexyl) glycerine ether.
7. The beta sulfuric acid ester of a,a'-di (2,5 dimethyl pentyl) glycerine ether.
8. The beta sulfuric acid ester of a,2-ethyl butyl a'-2 ethyl hexyl glycerine ether.

NORMAN D. SCOTT.